(12) United States Patent
Choi

(10) Patent No.: US 7,405,876 B2
(45) Date of Patent: Jul. 29, 2008

(54) PORTABLE SCREEN DEVICE WITH DUAL SHAFT STRUCTURE

(76) Inventor: Hae-Yong Choi, Mookdong I Park Apartment #108-301, 385 Mook-dong, Jungryang-gu, Seoul-city (KR) 131-768

( * ) Notice: Subject to any disclaimer, the term of this patent is extended or adjusted under 35 U.S.C. 154(b) by 375 days.

(21) Appl. No.: 11/374,129

(22) Filed: Mar. 14, 2006

(65) Prior Publication Data
US 2006/0209406 A1    Sep. 21, 2006

(30) Foreign Application Priority Data
Mar. 16, 2005   (KR)   ............... 10-2005-0022560

(51) Int. Cl.
*G03B 21/56* (2006.01)
(52) U.S. Cl. .................................... 359/461
(58) Field of Classification Search ............. 359/461
See application file for complete search history.

(56) References Cited
U.S. PATENT DOCUMENTS
6,297,905 B1 * 10/2001 Takamoto et al. ........... 359/461

FOREIGN PATENT DOCUMENTS
KR    2000-0017351    3/2000

* cited by examiner

*Primary Examiner*—W. B. Perkey
*Assistant Examiner*—Warren K Fenwick
(74) *Attorney, Agent, or Firm*—Bacon & Thomas, PLLC.

(57) ABSTRACT

A portable screen device having a dual shaft structure is disclosed. A left and a right rotation shafts are installed to an upper rod and the center of a lower frame of a screen in the horizontal direction and are connected to a left and a right supports. The rotation shafts are engaged with each other by a single adjusting device. When the screen moved up, the elasticity of the screen is held by left and right elastic wheels such that height of the screen is maintained. A magnet and a magnetic substance contact each other and are separated from each other at the central portions of the left and right supports. Due to rotation of a rotation rod installed in the intermediate portion of the supports, the screen moves up and down. Therefore, volume and weight of the portable screen device are reduced and the stability is increased.

4 Claims, 10 Drawing Sheets

PORTABLE SCREEN DEVICE WITH DUAL SHAFT STRUCTURE

BACKGROUND OF THE INVENTION

1. Field of the Invention

The present invention relates to a portable screen device for displaying an image projected from a projector, in particularly, to a portable screen device capable of moving a screen up and down when a screen is maintained horizontal by dual rotation shafts, maintaining the height of the screen by substituting a structure using a gas spring or a coil spring with a structure of right and left eccentric rotation shafts, having a remarkably reduced volume and weight, and increased stability.

2. Description of the Related Art

In portable screen devices, since the less a volume is the more convenient it is to carry and the lighter it is the more practical, a structure for reducing volume and weight is a very important development and goal.

As structures of a conventional portable screen device, a structure, in which a screen rolled around a spring rotation shaft is accommodated in an accommodating case, has been proposed and a structure, in which the accommodating case is installed at a certain place and a screen is pulled up or maintained at a height by a pantograph using elasticity of a coil spring or a gas spring, is already used.

As the conventional gas spring or the coil spring is used, the performance such as the quantity of gas is decreased or the elasticity of the coil spring is deteriorated. Actually, as a result of checking the screen devices returned by customers, malfunction caused by the coil spring or the gas spring accounts for more than 40 percent.

According to a movable screen device disclosed in Korean Patent Publication No. 10-2000-0017351 (Claimed Priority, Japanese Patent Application Nos. 98-234542 and 99-006345), rotation shafts of right and left arms of a pantograph are coaxially arranged by duplicating the arms at a top bar or at the lower end thereof in the front-to-rear direction to maintain their horizontality when the screen moves up and down.

The conventional movable screen device further includes a height-maintaining device for canceling the elastic force of a spring generated, when the screen moves up and down to a position, by the gas spring or the coil spring.

However, since two arms are duplicated in the front-to-rear direction about a vertical axis in the coaxial structure b, the volume of the conventional movable screen device is increased.

In addition, there is a plurality of the gas springs or the coil springs as the height-maintaining device, the conventional movable screen device is heavy and its volume is increased.

Moreover, the conventional movable screen device further includes a single lozenge-shaped member as a support assembly to form lozenge-shaped dual supports.

However, since in this movable screen device the right and the left arms are structured in the front-to-rear direction by the coaxial structure, its volume increases, and since the gas springs or the coils springs are uses as the height-maintaining device, the conventional movable screen device is also heavy and its volume increases.

Further, there is another conventional movable screen device in which a right elastic coupler and a left elastic coupler are installed to hinges for connecting the arms of the pantograph or the top bar such that the right and the left elastic couplers rotate in directions opposite to each other, plate springs installed in the rear sides of the right and the left elastic couplers to apply elastic force thereto, and a brake lever pushes the right and the left couplers. The another conventional movable screen device, like the conventional movable screen device, is identical to the conventional movable screen device in view of structuring the right and the left arm as the coaxial structure using a single shaft and has advantages capable of substituting the coil springs or the gas springs with frictional pads, spring devices, brake levers. However, the another conventional movable screen device rather increases its own weight and volume due to the additional devices such as the brake levers, the addition of elastic maintaining spring structure, and the expansion of a space necessary for operating the devices.

Moreover, according to the another conventional movable screen device, in order to fix the screen at a predetermined position, the brake levers must be released and must be locked at the predetermined position again sequentially so that the height of the screen is fixed. Thus, it is very inconvenient.

SUMMARY OF THE INVENTION

Therefore, the present invention has been made in view of the above and/or other problems, and it is an object of the present invention to provide a portable screen device in which a structure in which a component, whose performance is deteriorated as the more it is used, such as a gas spring, a gas shock absorber, or a brake lever as a necessity of the conventional screen device is removed, right and left eccentric dual shafts brake the movement of a screen in the vertical direction, weight and volume are reduced, height of the screen is simply and conveniently adjusted, and right and left supports are assembled and dissembled by magnetic force of a permanent magnet to increase its own firmness.

BRIEF DESCRIPTION OF THE DRAWINGS

These and/or other aspects and advantages of the present invention will be come apparent and more readily appreciated from the following description of the embodiments, taken in conjunction with the accompanying drawings, in which.

DESCRIPTION OF THE PREFERRED EMBODIMENTS

Figure 1:
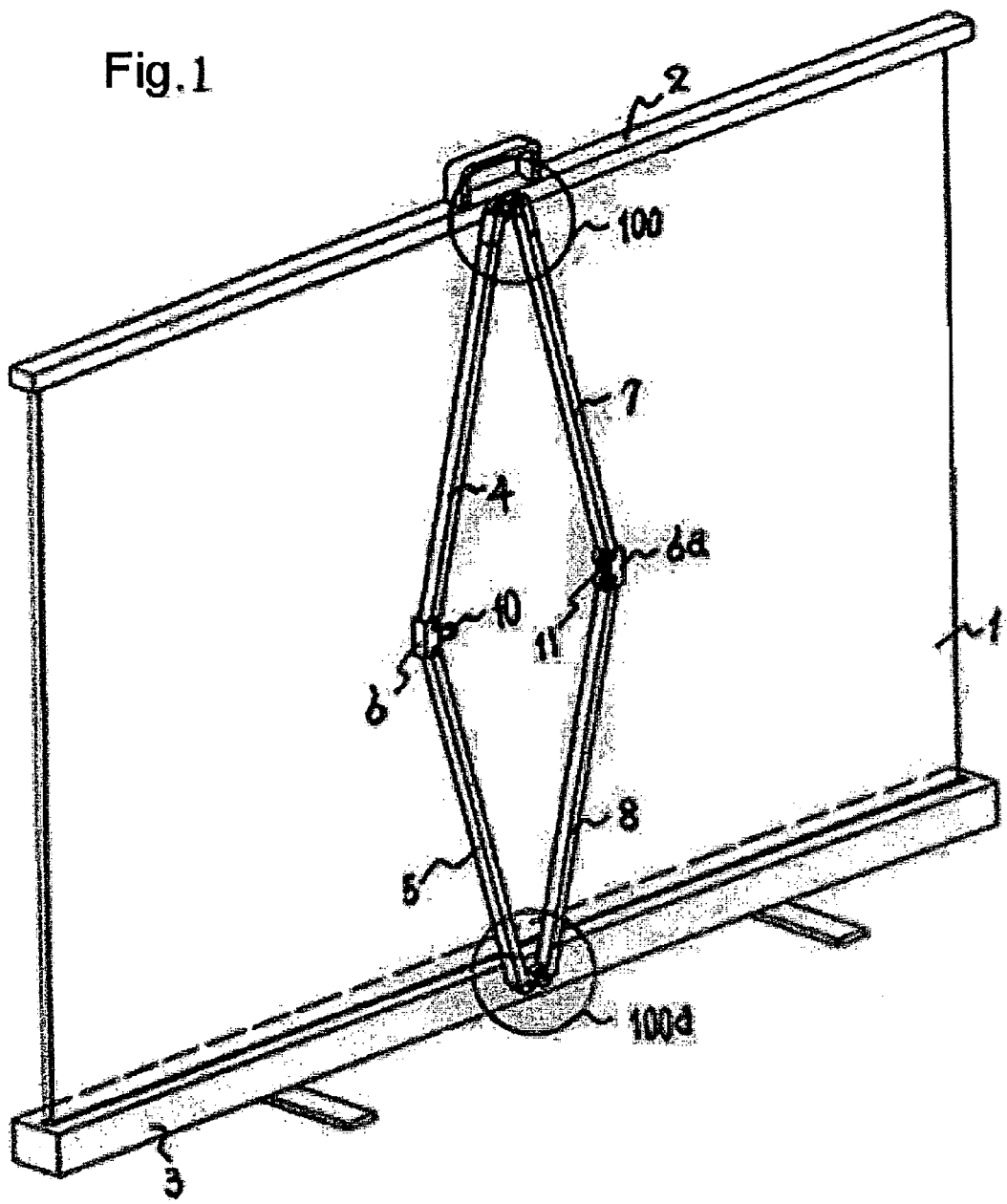
FIG. 1 is a view illustrating an outer appearance of a portable screen device having a dual shaft structure according to a preferred embodiment of the present invention.
Figure 2:
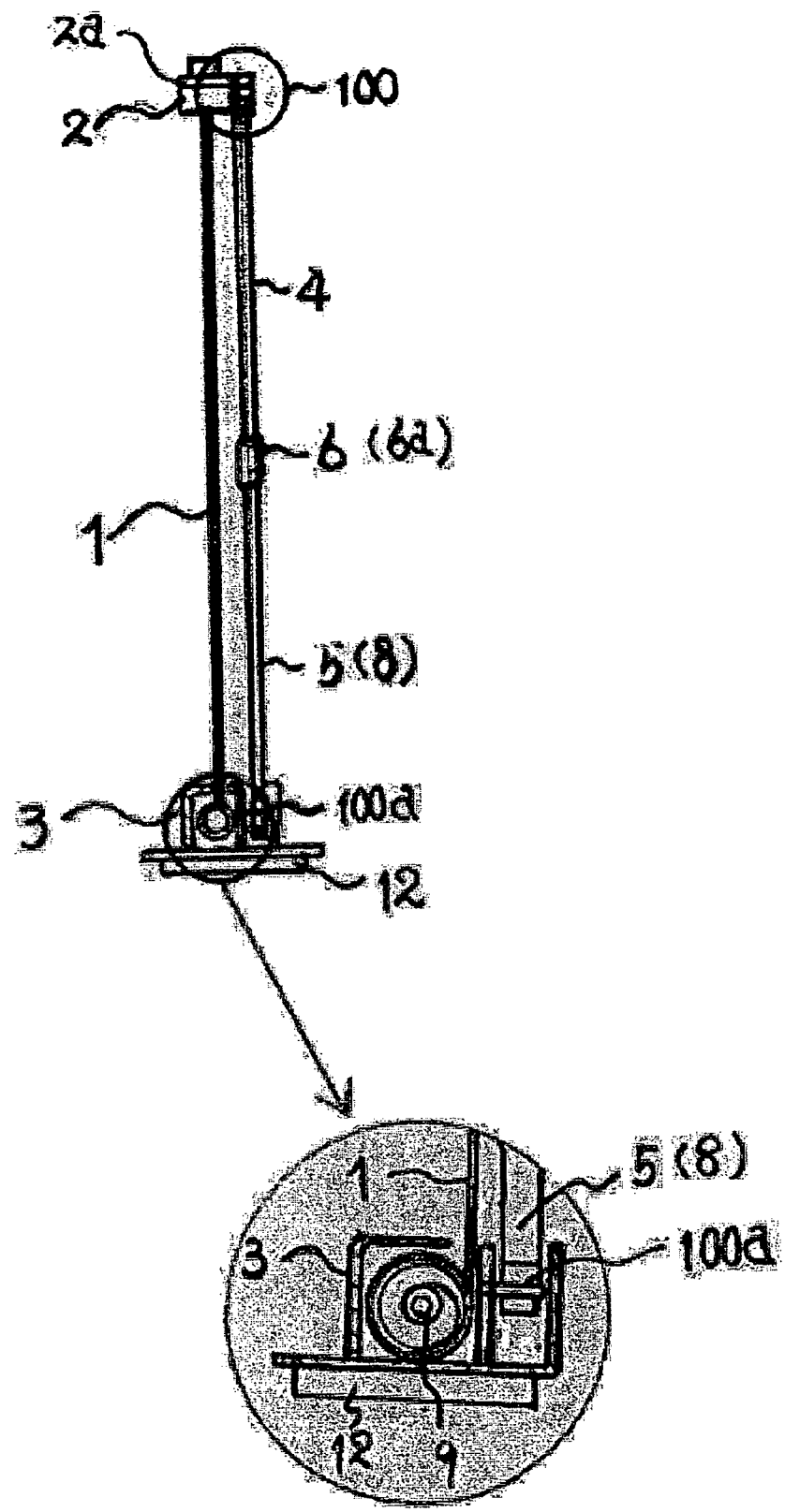
FIG. 2 is a side view illustrating the portable screen device having a dual shaft structure according to the preferred embodiment of the present invention as shown in FIG. 1.

A portable screen device having a dual shaft structure according to a preferred embodiment of the present invention, as shown in FIGS. 1, 2, 3, 4, 5, 6, and 7, includes an upper rod 2 installed in the upper side of the portable screen device, a spring rotation rod 9 installed inside a lower frame 3 and having a spring 3a installed as shown in FIG. 2, and a screen 1 connected to the upper rod 2 and the spring rotation rod 9 to be rolled in and out according to the rotation of the spring rotation rod 9.

When the upper rod 2 is pulled up, since the spring 3a in the spring rotation rod 9, as shown in FIG. 2, is wound in, the screen 1 and the upper rod 2 are pulled down due to gravity, if the upper rod 1 is free, the spring rotation rod 9 is rotated by the spring 3a to automatically wind the screen 1.

Figure 3:
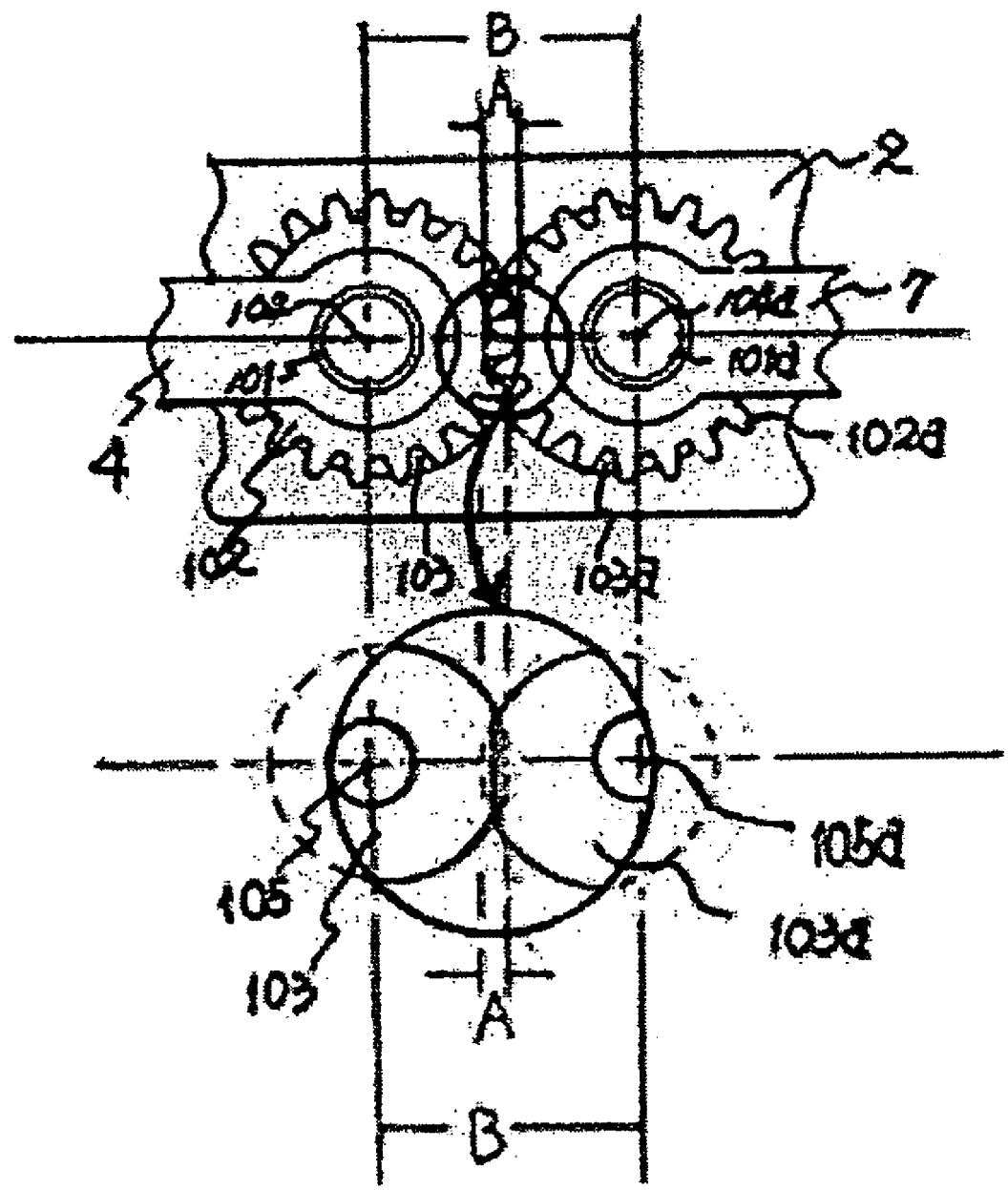
FIG. 3 is a view illustrating an adjusting device of the portable screen device having a dual shaft structure according to the preferred embodiment of the present invention.
Figure 4:
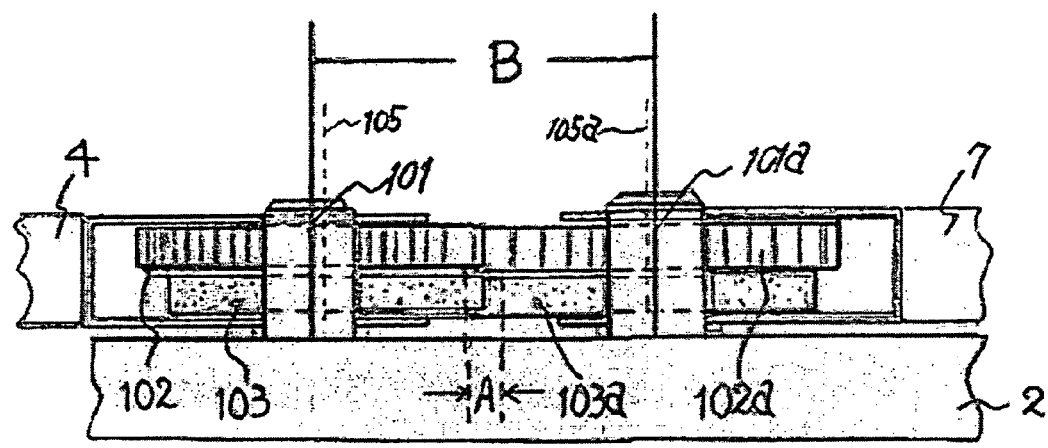
FIG. 4 is a sectional view illustrating the adjusting device of the portable screen device having a dual shaft structure according to the preferred embodiment of the present invention.

As shown in FIGS. 3 and 4, an upper adjusting device 100 is installed in the upper side of the upper rod 2 such that an upper left support 4 and an upper right support 7 are symmetrically fixed to horizontal ends thereof respectively, and a lower adjusting device 100a is installed in the lower frame 3 such that a lower left support 5 and a lower right support 8 are symmetrically fixed to horizontal ends of the lower adjusting device 100, wherein the upper left support 4 is connected to the lower left support 5 by a hinge 6 and the upper right support 7 is connected to the lower right support 8 by a hinge 6a to be respectively rotated within 180 degrees. As described above, in the conventional screen device, it is required to provide a height adjusting device so that the screen can be lifted up when using the screen device and the screen device can be folded to carry.

Thus, as the important feature of the portable screen device according to the preferred embodiment of the present invention, the adjusting device 100 and 100a will be described in more detail as follows.

FIG. 3 is a view illustrating the adjusting device 100 and 100a of the portable screen device having a dual shaft structure according to the preferred embodiment of the present invention, and FIG. 4 is a sectional view illustrating the adjusting device 100 and 100a of the portable screen device having a dual shaft structure in FIG. 3.

The adjusting devices 100 and 100a respectively installed in the upper rod 2 and the lower frame 3 have an identical structure and are disposed at the upper side and the lower side of the screen device, so that they work symmetrically.

As shown in FIGS. 3 and 4, a left rotation shaft 101 and a right rotation shaft 101a, installed in the intermediate portion of the upper rod 2, form a dual shaft structure, and a distance B between the left rotation shaft 101 and the right rotation shaft 101a is fixed.

The left rotation shaft 101 and the right rotation shaft 101a spaced apart from each other by the distance B are engaged with each other via a left elastic wheel 103 and a right elastic wheel 103a, which are mounted around the left rotation shaft 101 and the right rotation shaft 101a as eccentric shafts symmetrically with each other, and rotate.

Moreover, the left rotation shaft 101 is integrally coupled with the left elastic wheel 103 and the upper left support 4 to be rotated forward and reversely, and the right rotation shaft 101a is integrally coupled with the right elastic wheel 103a and the upper right support 7 in the same manner as the left rotation shaft 101.

The distance B between the left rotation shaft 101 and the right rotation shaft 101a is set to a fixed distance B such that a left gear 102 and right gear 102a are respectively installed to the left elastic wheel 103 and the right elastic wheel 103a and are engaged with each other to rotate.

The left elastic wheel 103 and the right elastic wheel 103a are not limited to circular shapes or oval shapes, and the left rotation shaft 101 and the right rotation shaft 101a of the left elastic wheel 103 and the right elastic wheel 103a are preferably eccentric shafts to be rotated by the left eccentric shaft 105 and the right eccentric shaft 105a.

As shown in FIGS. 3 and 4, the right gear 102 and the left gear 102a have real circular shapes and rotate about central axes as those of the right rotation shaft 101 and the left rotation shaft 101a having normal central axes.

In other words, the elastic wheels 103 and 103a are eccentrically rotated about a left eccentric shaft 105 and a right eccentric shaft 105a, and the left and right gears 102 and 102a are normally rotated about the left eccentric shaft 105 and the right eccentric shaft 105a.

In more detail, since the rotation shafts of the left and right elastic wheels 103 and 103a are the left eccentric shaft 105 and the right eccentric shaft 105a and the rotation shafts 101 and 101a of the left and right gears 102 and 102a are identical rotation shafts, the distance between the left and right eccentric shaft 105 and 105a is also the fixed distance B.

The left eccentric shaft 105 and the right eccentric shaft 105a are installed to the upper rod 2 and the lower frame 3 and are spaced apart from each other by the same fixed distance to serve as fixed shafts for the rotation of the left and the right elastic wheels 103 and 103a and the left and the right gears 102 and 102a.

The left and the right gears 102 and 102a and the left and the right elastic wheels 103 and 103a are made of urethane, silicone rubber, or elastic metal, and there is no specific limit to the materials.

Figure 5:
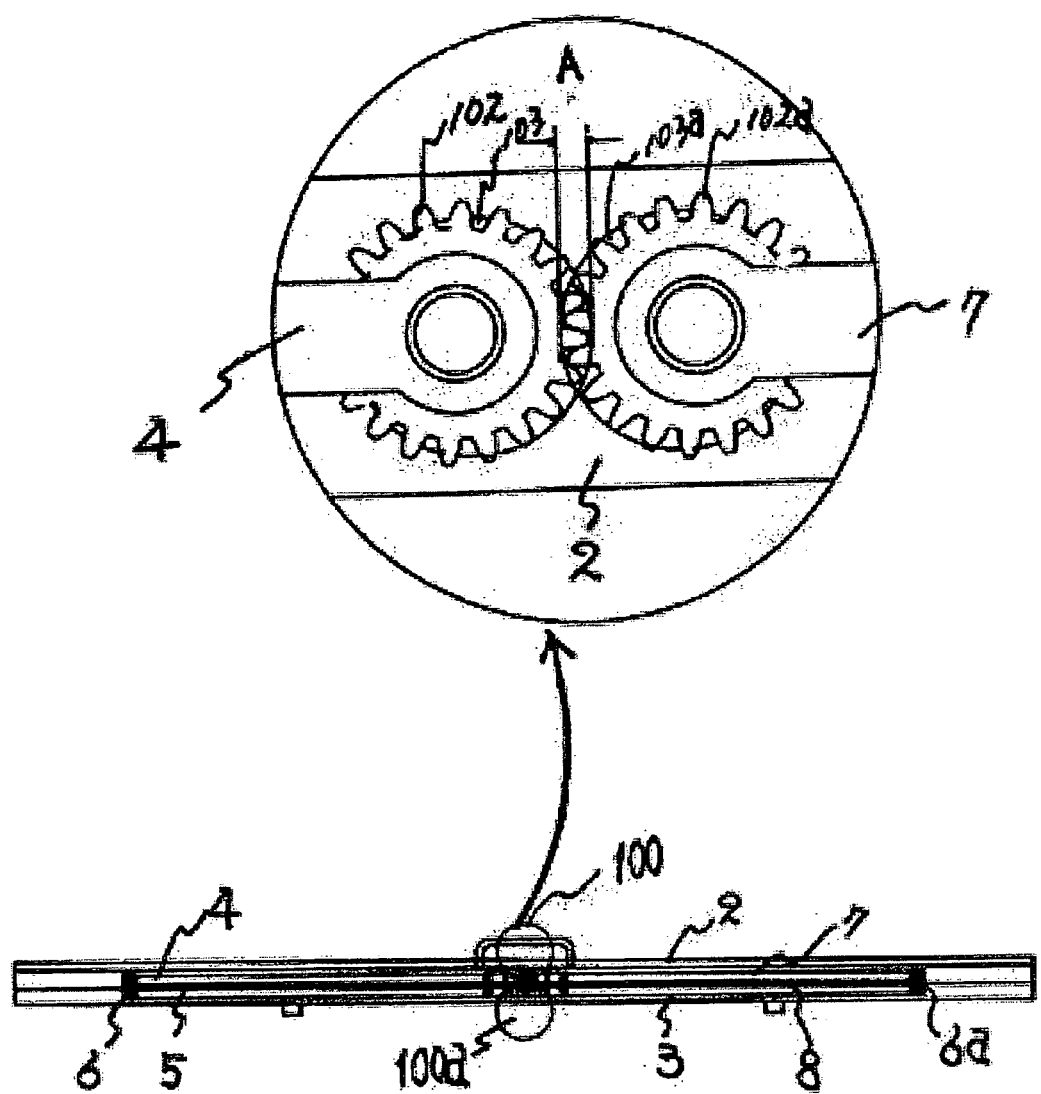
FIGS. 5, 6, and 7 are views illustrating operation of an adjusting device of the portable screen device having a dual shaft structure according to the preferred embodiment of the present invention.
Figure 6:
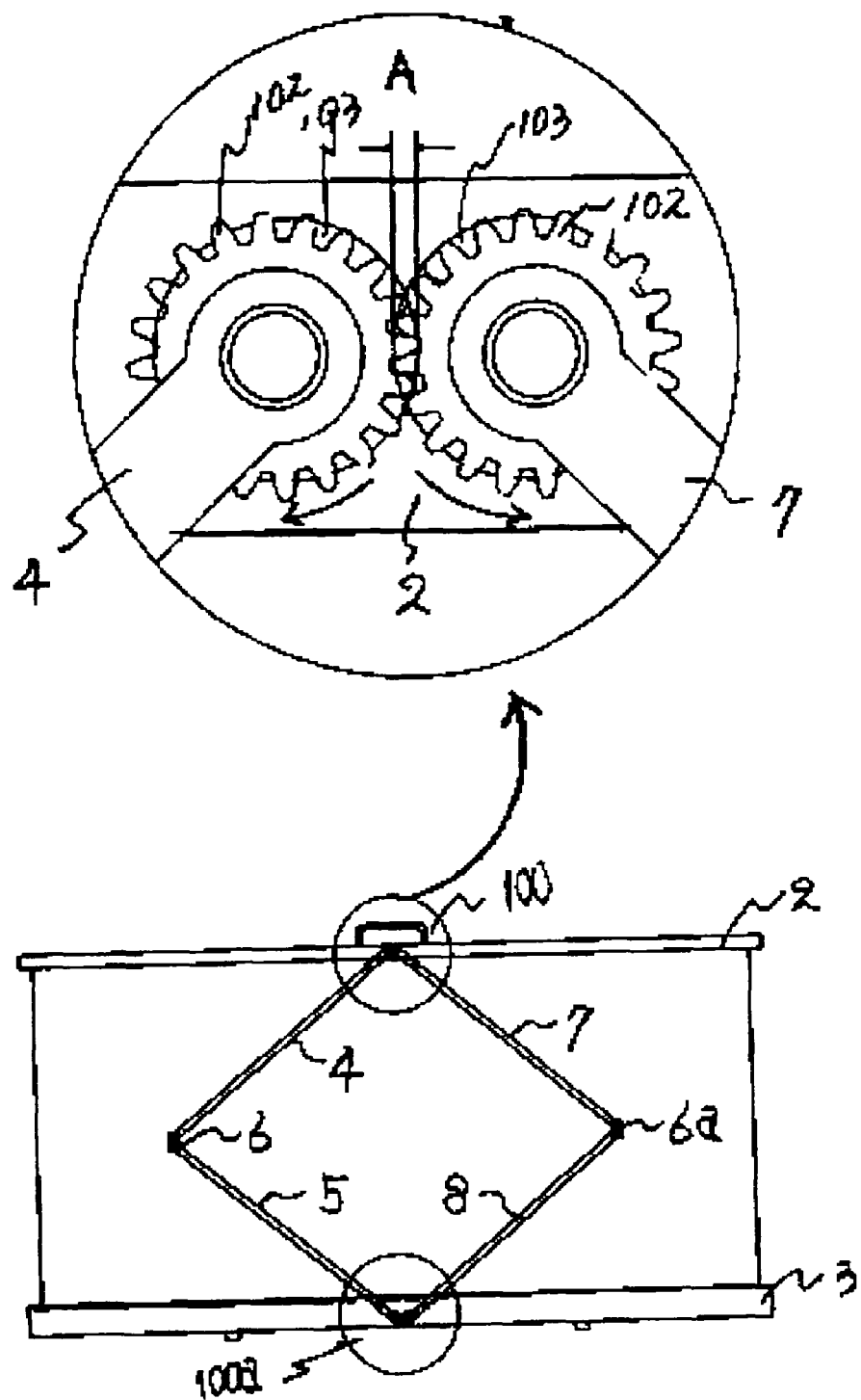
Figure 7:
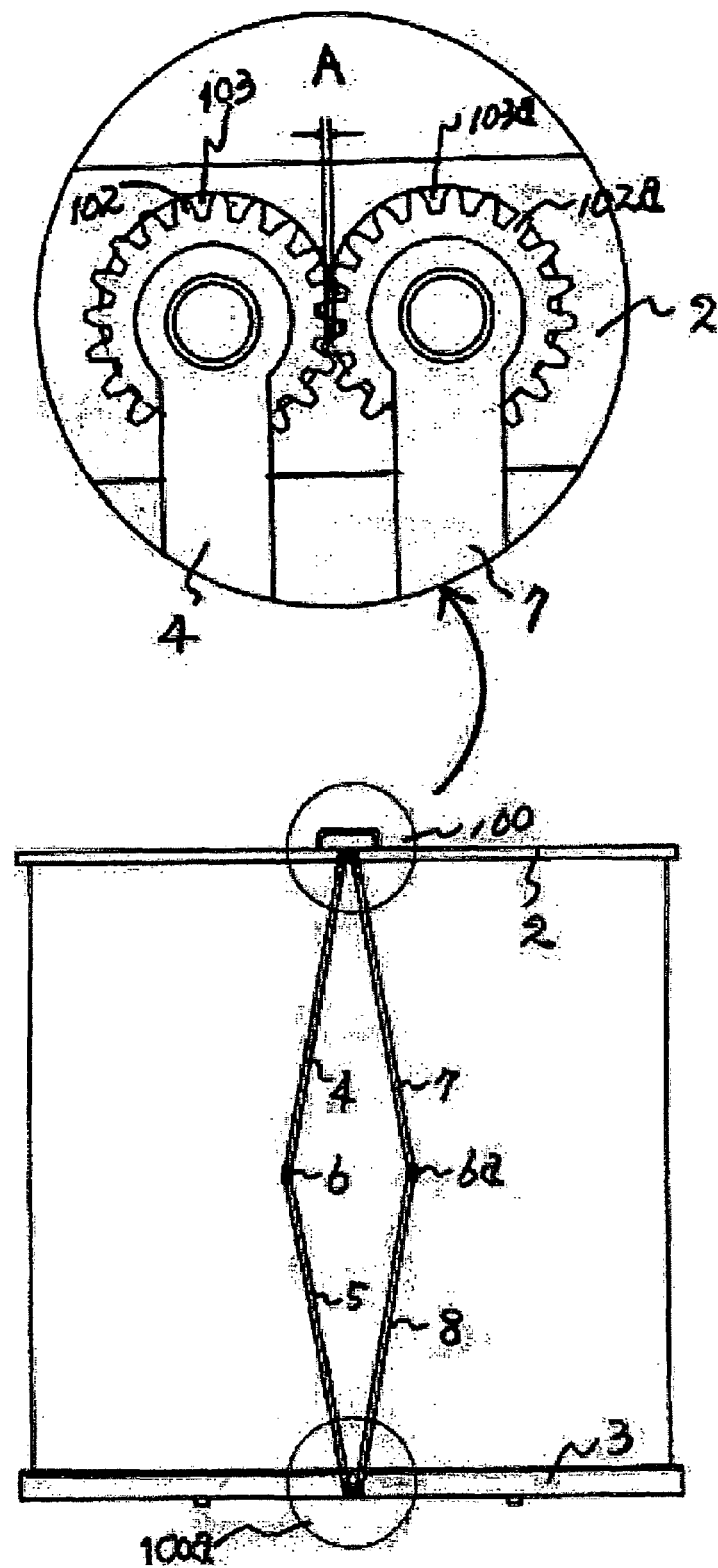

FIG. 5 is a view illustrating the use of the portable screen device according to the preferred embodiment of the present invention, FIG. 6 is a view illustrating the portable screen device according to the preferred embodiment of the present invention when the upper rod 2 is pulled up about halfway, and FIG. 7 is a view illustrating the portable screen device according to the preferred embodiment of the present invention when the upper rod 2 is pulled up to the upper limit.

In order to use the portable screen device according to the preferred embodiment of the present invention, it starts from the state of FIG. 5 to the state of FIG. 7 via the state of FIG. 6, and in order to carry the portable screen device according to the preferred embodiment of the present invention, the process as described above will be reversely performed.

As shown in FIG. 5, when the upper left support 4 and the upper right support 7 are arranged in series, an engagement area A between the left elastic wheels 103 and the right elastic wheels 103a due to the eccentric rotation of the left and the right elastic wheels 103 and 103a is the maximal, and when the upper left support 4 and the upper right support 7 are rotated by 90 degrees and arranged in parallel as shown in FIG. 7 via the state of FIG. 6, the engagement area A therebetween is the minimal.

Figure 8:
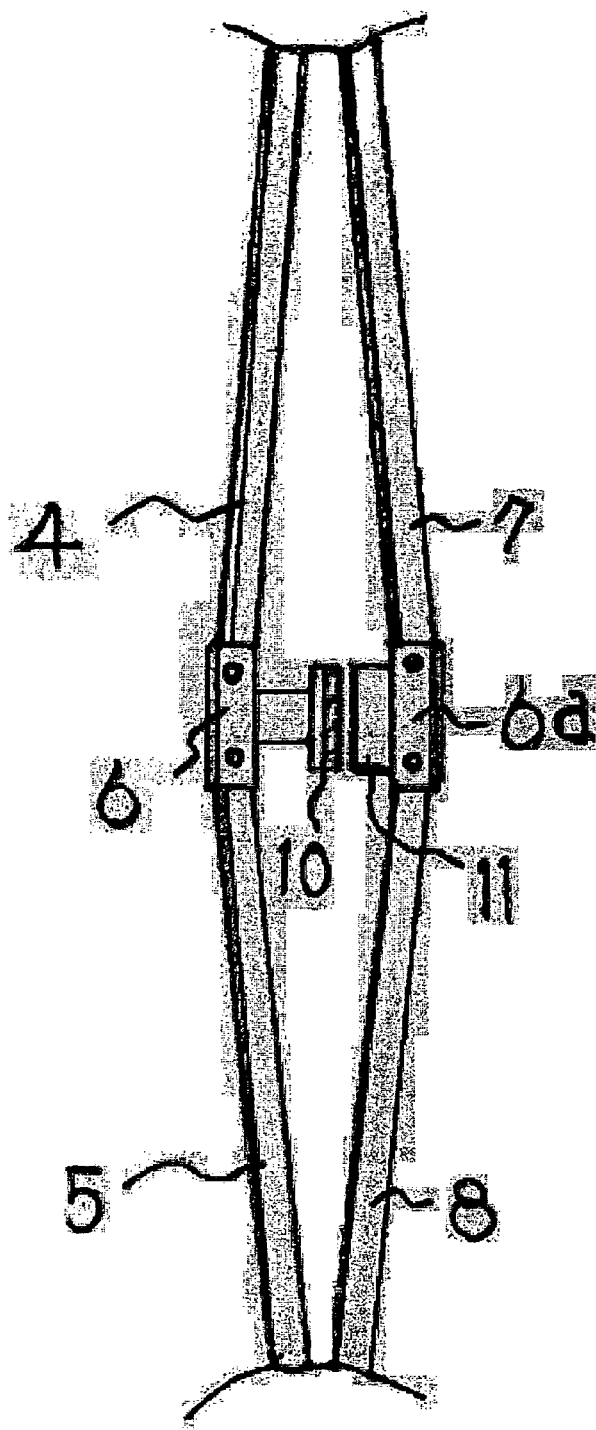
FIG. 8 is a view illustrating the magnetic adjusting device of the portable screen device having a dual shaft structure according to the preferred embodiment of the present invention.

In the portable screen device according to the preferred embodiment of the present invention, as shown in FIG. 8, in the vicinity of the left and the right hinges 6 and 6a for respectively connecting the upper left support 4 to the lower left support 5 and the upper right support 7 to the lower right support 8, a magnet 10 and a magnetic substance 11 such as metal, for example steel plate or a magnet to react to a magnetic substance are installed to contact each other for the reinforcement of the upper left support 4, the lower left support 5, the upper right support 7, and the lower right support 8 when the screen 1 is erected at the maximum height and to be automatically separated from each other when the upper rod 2 is pressed.

As such, since the magnet 10, as shown in FIG. 6, securely prevents the movement of the screen 1 when the screen 1 is erected, the weight and the volume of the portable screen device having a dual shaft structure according to the preferred embodiment of the present invention are significantly reduced in comparison to the conventional screen devices and the stability thereof can be increased more than two times.

Moreover, as shown in FIG. 8, when the structure consisting of the magnet 10 and the magnetic substance 11 is substituted with the adjusting device 100 and 100a having a dual shaft structure, it is possible to form the dual shaft structure with only the left rotation shaft 101 and the right rotation shaft 101a installed by the fixed distance B therebetween.

Figure 10:
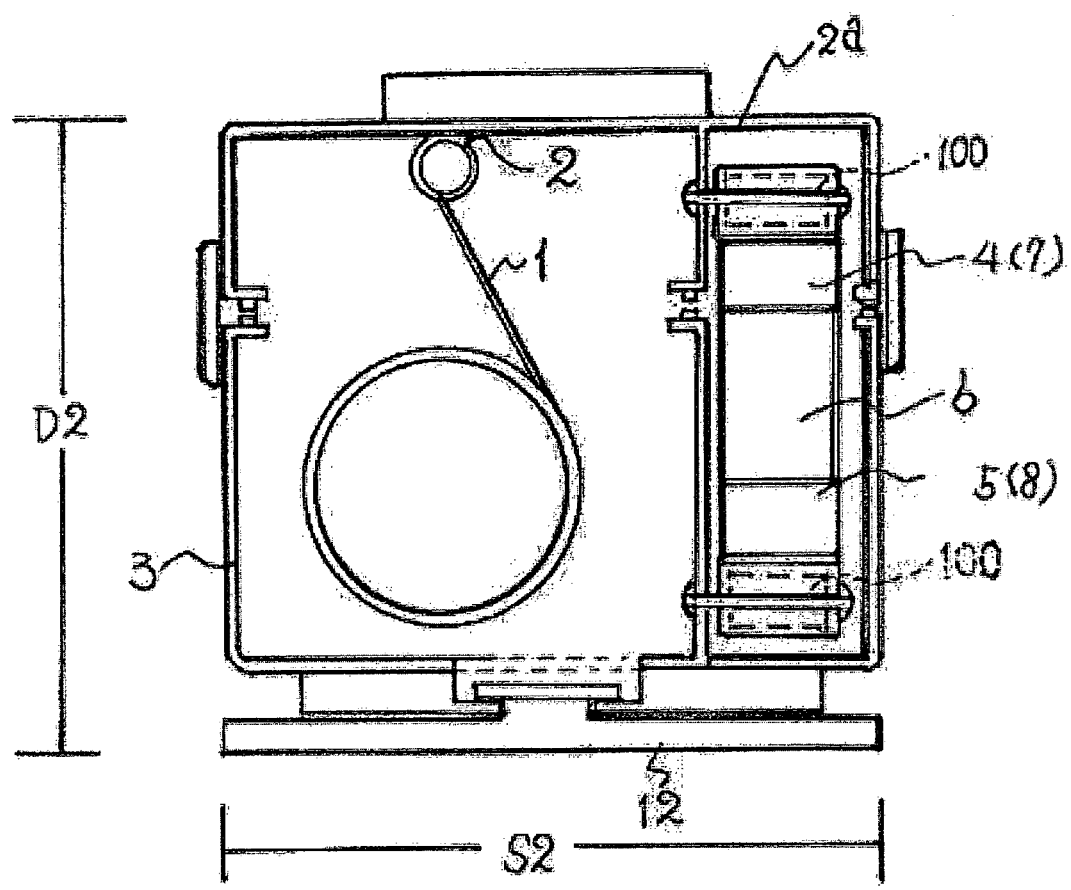
FIG. 10 is a sectional view illustrating volume of the portable screen device according to the preferred embodiment of the present invention.

Moreover, the portable screen device having a dual shaft structure according to the preferred embodiment of the present invention can be made in a case shape by modifying the upper rod 2, as shown in FIG. 10, into a lid 2a and coupling the lid 2a with the lower frame 3.

Moreover, according to size of the screen 1, a single adjusting device 100 and 100a may be installed to either the upper rod 2 or the lower frame 3, or the adjusting devices 100 and 100a may be installed to all the joints between the upper left support 4 and the lower left support 5 and the upper right support 7 and the lower right support 8.

Within the scope without departing from the principle of the present invention, the portable screen device having a dual shaft structure can be modified from the structure in which the upper rod 2 and the lower frame 3 are installed in the horizontal direction to a structure in which the upper rod 2 and the lower frame 3 are installed in the vertical direction and foldable supports 12 are installed to the lower ends of the upper rod 2 and the lower frame 3 to operate the portable screen device in the right-to-left direction.

Figure 9:
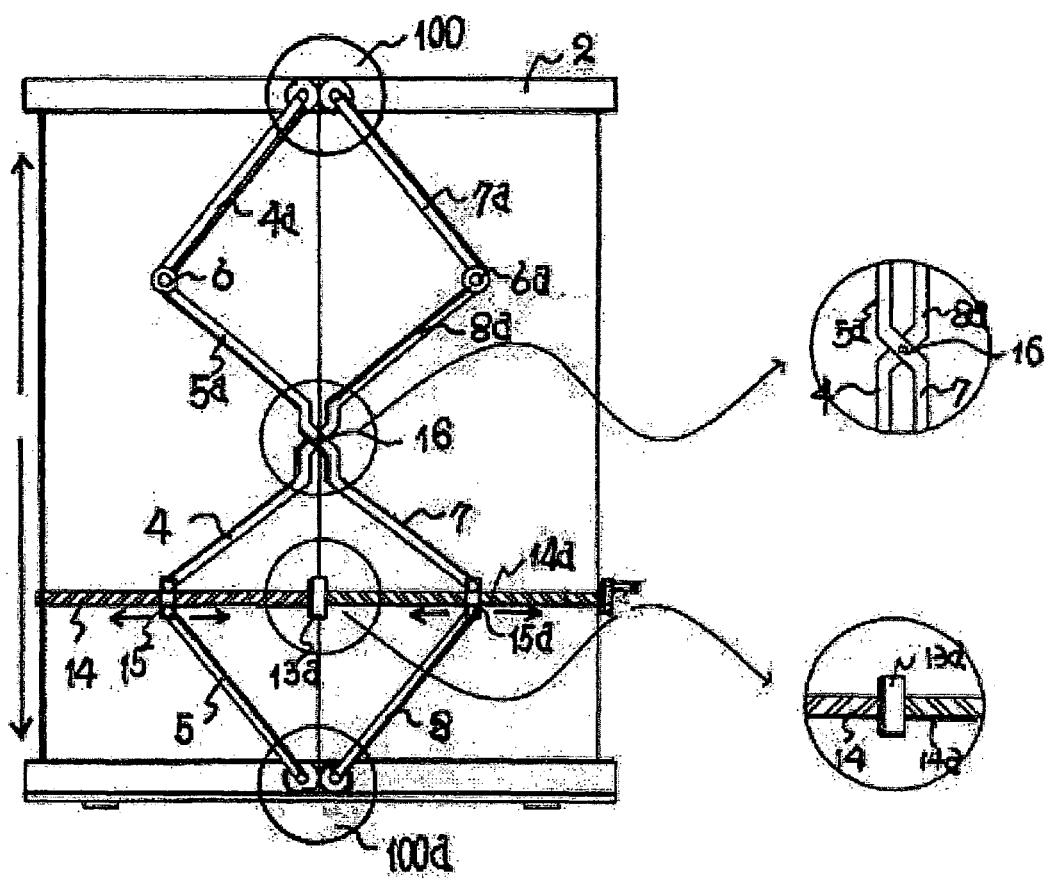
FIG. 9 is a view illustrating use of the portable screen device having a dual shaft structure according to the preferred embodiment of the present invention.

Moreover, as shown in FIG. 9, the adjusting devices 100 and 100a having the dual shaft structure are installed in the upper rod 2 and the lower frame 3 by the fixed distance B and the upper left support 4 and the lower left support 5 and the upper right support 7 and the lower right support 8 are installed in the same manner. Additionally, a central rotation shaft 16 penetrates central portions of the upper left support 4, the lower left support 5, the upper right support 7, and the lower right support 8 to increase the height of the screen 1 when using the same.

In the above structure, left and right nuts 15 and 15a are symmetrically installed to the centers of the left and the right hinges 6 and 6a of the supports 4, 5, 7, and 8 which are disposed at the lower side of the portable screen device of the preferred embodiment of the present invention and a rotation rod 13 penetrates the nuts 15 and 15a whose a left-hand threads 14 and a right-hand threads 14a are formed in the left side and in the right side with respect to a central rod 13a respectively.

In this structure, when the rotation rod 13 is rotated, the upper left support 4 and the lower left support 5, connected to the left nut 15 and the upper right support 7 and the lower right support 8, connected to the right nut 15a approach each other, and simultaneously the upper left support 4, the lower left support 5, the upper right support 7, and the lower right support 8, disposed in the upper side, also approach each other via the central rotation shaft 16, so that the distance therebetween becomes less to unfold the screen 1 upwardly. When the rotation rod 13 is rotated reversely, the screen 1 is wound again due to the reverse operation.

In this case, even when the left and the right gears 102 and 102a or the left and the right elastic wheels 103 and 103a are removed from the rotation shafts of the adjusting devices 100 and 100a having a dual shaft structure, the screen 1 is firmly supported by the rotation rod 13.

At that time, since the upper left support 4 and the upper right support 7 are rotated by the engagement between the left elastic wheel 103 and the right elastic wheel 103a or the left gear 102 and the right gear 102a, the upper left and right supports 4 and 7 work like a single shaft in spite of having the dual shaft structure so that the upper rod 2 stably maintains horizontality and moves up and down.

Moreover, since the left and the right gears 102 and 102a are always engaged with each other to rotate because the distance B between the rotation shafts of the left and the right gears 102 and 102a does not change and the left and the right elastic wheels 103 and 103a are forced to rotate by the left and the right gears 102 and 102a although pressure of the left and the right elastic wheels 103 and 103a would be applied inconsistently due to friction of the left and the right elastic wheels 103 and 103a, the left and the right elastic wheels 103 and 103a rotating together with the left and the right gears 102 and 102a rotate without slipping so that the screen 1 resists gravity exerted on the spring rotation rod 9, that is, a downward force, and as a result, is automatically and smoothly braked at a certain position.

Naturally, the above-described operation is carried out identically in the adjusting device 100 and 100a installed to the lower frame 3 and the upper adjusting device 100 and 100a in the vertical direction.

In this case, without the gas spring or the coil spring as a device for opening and closing the screen 1 using the rotation rod 13, the height of the screen can be securely adjusted by the dual rotation shafts and the rotation rod 13.

Thus, although the conventional screen device cancels a force of a spring for pulling the screen 1 with an elastic force of a gas spring or a coil spring, the portable screen device having a dual shaft structure according to the preferred embodiment of the present invention automatically holds the height of the screen has advantages of automatically holding the height of the screen 1 using the adjusting devices 100 and 100a having a dual shaft structure so that the braking is smooth and secures so that the volume thereof is remarkably reduced.

The portable screen device having a dual shaft structure as shown in FIG. 10 can reduce the volume by 50% to 75% of the conventional screen device by removing the height-maintaining device such as the gas spring and by changing arms into the parallel dual shaft structure.

Moreover, according to the portable screen device having a dual shaft structure of the present invention, when the left and the right gears 102 and 102a and the left and the right elastic wheels 103 and 103a are removed from the dual shaft structure and the adjusting device 100 and 100a is structured by only the magnet 10 and the magnetic substance 11, the screen can be opened and closed by one touch and its weight can be also reduced.

In other words, when, as shown in FIG. 5, the screen 1 is pulled up, the magnets 10 and the magnetic substances 11 disposed in the rear side of the screen 1 contact each other so that the upper left support 4 and the lower left support 5 are straightened parallel to the upper right support 7 and the lower right support 8 to unfold and support the screen 1. When the upper rod 2 of the screen 1 is pressed, the magnets 10 and the magnetic substances 11 are separated from each other so that the screen 1 is folded in a one-touch manner.

Moreover, as shown in FIG. 9, since the height of the upper rod 2 of the portable screen device having a dual shaft structure according to the present invention can be adjusted by only the rotation of the rotation rod 13, the volume and the weight of the portable screen device having a dual shaft structure can be remarkably reduced and the stability can be increased when opening and closing the screen 1.

Therefore, in the conventional portable screen devices, the more the gas spring or the coil spring is used the more the elasticity thereof is deteriorated. However, according to the present invention, since the adjusting devices are structured by the dual shafts made of the left and the right eccentric shaft 105 and 105a, the endurance of the portable screen device of the present invention is remarkably increased. Since the upper left support 4, the lower left support 5, the upper right support 7, and the lower right support 8 contact each other and are separated from each other due to the magnetic substances 11, the stability of the portable screen device of the present invention when in use is increased by more than two times. The conventional two arms formed in a series that perform as a single shaft are changed into the left and the right elastic wheels 103 and 103a of a dual shaft structure installed in the horizontal direction and perform as the single shaft structure so that the screen 1 smoothly moves up and down and the volume and weight of the portable screen device of the present invention is remarkably reduced. Therefore, the portable screen device having a dual shaft structure of the present invention is more effective to use for education purposes, portable presentations, and meetings.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A portable screen device having a dual shaft structure in which a screen moves up and down in a horizontal state, comprising:
   an adjusting device having a dual shaft structure comprising a left rotation shaft and a right rotation shaft respectively installed to an upper rod and a lower frame of the screen; and
   a left elastic wheel and a right elastic wheel provided on a left eccentric shaft and a right eccentric shaft of the left rotation shaft and the right rotation shaft respectively; wherein
   the left eccentric shaft and the right eccentric shaft are spaced apart from the left rotation shaft and the right rotation shaft by a fixed distance therebetween respectively, and the left elastic wheel of the left rotation shaft is engaged with the right elastic wheel of the right rotation shaft to rotate together.

2. The portable screen device having a dual shaft structure as set forth in claim 1, wherein the adjusting device comprises:
   a left gear installed on the left elastic wheel; and
   a right gear installed on the right elastic wheel and engaged with the right gear to rotate together with the left gear.

3. A portable screen device having a dual shaft structure in which a screen moves up and down in a horizontal state, comprising:
   an adjusting device having a dual shaft structure including:
   a left rotation shaft and a right rotation shaft respectively installed to an upper rod and a lower frame of the screen;
   a magnet associated with one side of the hinges for connecting an upper left support to a lower left support and an upper right support to a lower right support; and
   a magnetic substance installed to the opposite side of the hinges, wherein the left rotation shaft and the right rotation shaft are spaced apart from each other by a fixed distance.

4. A portable screen device having a dual shaft structure in which a screen moves up and down at a horizontal state, comprising:
   an adjusting device having the dual shaft structure including:
   a left rotation shaft and a right rotation shaft installed respectively to an upper rod and a lower frame of the screen;
   the adjusting device of the dual shaft structure including an upper left support and a lower left support and an upper right support and a lower right support;
   left and right nuts formed with threads and symmetrically installed to the intermediate portion of the upper left support and the lower left support and to the intermediate portion of the upper right support and the lower right support; and
   a rotation rod penetrating the right and the left nuts and having a left-hand thread shaft and a right-hand thread shaft with respect to a central rod.

* * * * *